Nov. 19, 1968   A. C. O'HARA ET AL   3,411,711

CONTROL MECHANISM

Filed Aug. 25, 1967

INVENTORS.
ARTHUR C. O'HARA.
RICHARD C. DREIBELBIS
ARTHUR C. HOMEYER.

BY *Raymond Curtin*

ATTORNEY.

United States Patent Office 3,411,711
Patented Nov. 19, 1968

3,411,711
CONTROL MECHANISM
Arthur C. O'Hara, Syracuse, N.Y., and Richard C. Dreibelbis, Fair Lawn, and Arthur C. Homeyer, Essex Fells, N.J., assignors to Carrier Corporation, Syracuse, N.Y., a corporation of Delaware
Continuation-in-part of application Ser. No. 559,825, June 23, 1966. This application Aug. 25, 1967, Ser. No. 663,256
12 Claims. (Cl. 236—87)

ABSTRACT OF THE DISCLOSURE

A temperature regulator having a cooling bleed port and a heating bleed port on opposite sides of the regulator. A centrally located bimetallic element, movable in response to temperature variations in the area being regulated acts to block the appropriate bleed port to thereby build up control pressure in the line communicating therewith to effect a change in the output of the heating or cooling means associated with the regulator.

This application is a continuation-in-part of my co-pending application Ser. No. 559,825, filed June 23, 1966, now abandoned.

This invention relates to a control mechanism and more particularly to a novel bleed-type thermostatic control mechanism.

An important application of the present invention is in an induction type air conditioning system for use in large office buildings and the like, such as disclosed in United States Letters Patent No. 3,122,201, issued to Milton H. Coleman and Carlyle M. Ashley. In a system of this type, outside air, recirculated air, or a combination of both, is treated at a central station and then distributed at a relatively high pressure and velocity, to a plurality of units located in the areas to be conditioned. The high pressure air supplied to each unit is discharged therein through discharge nozzles, which induce a secondary air flow through the unit. The primary or conditioned air and the secondary or induced air are mixed within the unit and are then supplied to the area to be conditioned. Within each unit is a heat exchanger located in the path of air flow through the unit. Preferably, during winter operating conditions, a hot conditioning medium may be supplied to the heat exchanger while during summer operating conditions, a cold conditioning medium may be supplied to the heat exchanger. It will be understood under some circumstances piping may be so arranged that both hot and cold conditioning medium may be available at each unit.

It is preferred that the amount of conditioning medium supplied to each heat exchanger be substantially constant, that the amount of primary air supplied to each unit also be substantially constant, and that the quantity of induced air passing in heat exchange relation with the heat exchanger be varied by means of a damper in the unit which permits a desired quantity of induced air to pass through the heat exchanger of each unit or to bypass the heat exchanger as desired in order to vary the amount of total heat applied to or removed from the induced air while maintaining the total quantity of air discharged from the unit substantailly constant.

The damper disclosed in the aforementioned patent is actuated by a control system including a bellows provided with primary air under a predetermined control pressure from the plenum chamber of each unit. Air passes from the plenum chamber through a filter and an orifice and is diverted to one of two outlets. For non-changeover operation, varying air pressure is diverted from downstream of the orifice to the expansible bellows. For changeover operation, one outlet near the orifice is connected to the expansible bellows for actuating the damper. Another outlet, downstream of the orifice, is connected to a changeover valve. The changeover valve includes a thermal actuator which senses the approximate temperature of the conditioning medium flowing through the heat exchanger and causes the air passing through the changeover valve to flow to either the heating section or the cooling section of the bleed-type thermostatic control mechanism. The air flowing to the control mechanism is passed to the atmosphere from either the heating portion or the cooling portion thereof depending upon the operating condition. Present bleed-type control mechanisms of the kind described are quite complicated and expensive.

The primary object of this invention is to provide an improved bleed-type control mechanism.

Another object of this invention is to provide a dual-bleed control mechanism employing a single bimetallic element.

A further object of this invention is to provide a bleed-type control mechanism having a built-in pressure relief to prevent damage to the control system due to excessive pressures therein.

Another object of this invention is to provide a bleed-type control mechanism wherein the bleed air is exhausted so as to induce room air over the bimetallic element to provide an accurate sensing of room temperature.

This invention relates to a dual-bleed control mechanism for use in a heating-cooling type control system employed in air conditioning apparatus, comprising a support with a U shaped bimetallic element pivotally mounted thereon. A bleed air block mounted on the support is provided with a heating cycle control air inlet and a cooling cycle control air inlet. The bleed air block is also provided with a cooling cycle control air discharge port and a heating cycle control air discharge port on the upper surface thereof. Blocking means operably associated with the bleed air block are provided for blocking either the heating cycle control air discharge port or the cooling cycle control air discharge port. The free end of the bimetallic element is directly connected to the blocking means for opening or closing the desired discharge port in response to room temperature.

Other objects and features of our invention will be apparent upon a consideration of the ensuing specification and drawings in which.

Figure 1:
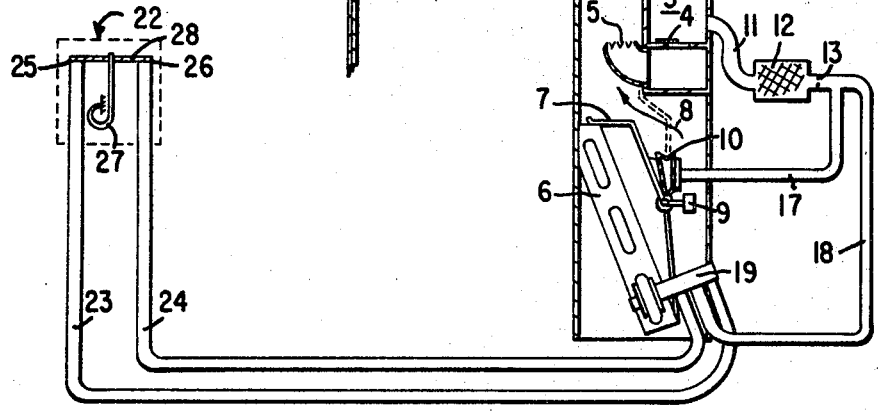
FIGURE 1 is a diagrammatic view of a control arrangement illustrating the preferred embodiment of the present invention as applied to a base unit forming a part of an air conditioning system.

In FIGURE 1 there is shown schematically a room unit provided with the control mechanism of the present invention. The room unit includes a casing 2 having a plenum chamber 3 therein. The plenum chamber is adapted for connection to a source of primary air. A balancing damper 4 in plenum chamber 3 is provided for regulating the air pressure supplied to the nozzles 5. A heat exchanger 6 is mounted in casing 2 so that a discharge of air from nozzles 5 induces room air through the bottom of the casing into heat exchange relationship with the conditioning medium passing through heat exchanger 6.

Passage of air through heat exchanger 6 is regulated by means of a damper 7. When the damper is open as shown by solid lines in FIGURE 1, secondary air will flow through bypass passage 8 and when the damper is closed, as shown in dotted lines in FIGURE 1, secondary air will flow through the heat exchanger. The damper 7 is urged clockwise as seen in FIGURE 1, by gravity as by means of a counterweight 9.

The means for urging damper 7 counterclockwise, as seen in FIGURE 1, toward the open position bypassing secondary air through passage 8, comprises an expansible member or bellows 10. The control air for actuating the bellows is preferably supplied from plenum chamber 3. Air flows from chamber 3 through line 11, filter 12 (which eliminates dust particles from the air) and restriction member 13. Control air pressure is transmitted through line 17 to the bellows 10. One wall of the bellows is fixed with respect to the unit; the other wall of the bellows is actuatable to move the damper 7.

Restriction member 13 is connected to a changeover valve 19 by line 18. The changeover valve is suitably affixed to heat exchanger 6 to sense the approximate temperature of the conditioning medium flowing through heat exchanger 6 and divert the control air to either the heating cycle portion or the cooling cycle portion of control mechanism or thermostat 22. Thermostat 22 is connected to changeover valve 19 by means of heating cycle line 23 and cooling cycle line 24, connected respectively to heating cycle port 25 and cooling cycle port 26. The thermostat bimetallic element 27 operates plate 28 in response to room air temperature changes to selectively bleed air from lines 23 or 24.

Referring to FIGURES 2, 3, 4 and 5, various views of the preferred embodiment of the control mechanism or thermostat 22 are shown. The thermostat 22 has a frame member 31 with a bleed block 32A mounted in an upper portion thereof. The bleed block has an inlet 33A communicating with heating lines 23 and an inlet 34A communicating with cooling line 24 through fittings 30. Heating port 25A and cooling port 26A formed in recessed portion 32 of block 32A communicate with inlets 33A and 34A respectively. A slider plate 28 is adapted for slidably blocking ports 25A and 26A. A slot 35 in slider plate 28 is provided for receiving the free end of bimetallic element 27 so that movement of the free end of bimetallic lement 27 causes the slider plate to move relative to bleed block 32A. A passage 36 is provided in bleed block 32 which allows the free end of bimetallic element 27 to project through slider plate slot 35, passage 36 being large enough to prevent contact between metallic element 27 and bleeder block 32A. The relationship of slider plate 28, bleed block 32A and frame member 31 is such as to provide a clearance space 21 between the flat top portion 31' of frame member 31 and the top of slider plate 28. The weight of slider plate 28 is sufficient under normal operating conditions to provide a seal for ports 25A and 26A. However, if the control system is subjected to abnormal pressures, the slider plate will be raised from the ports by the air pressure, thereby bleeding air from the control system to prevent any damage that could be caused by excessively high pressures.

Figure 2:
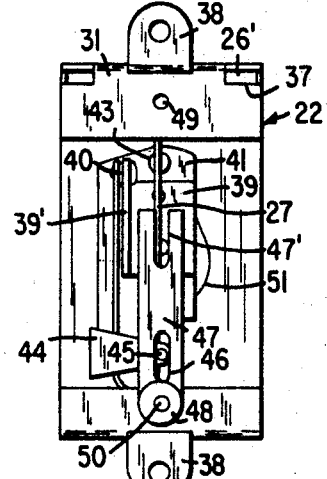
FIGURE 2 is a front elevational view of control mechanism shown diagrammatically in FIGURE 1.
Figure 3:
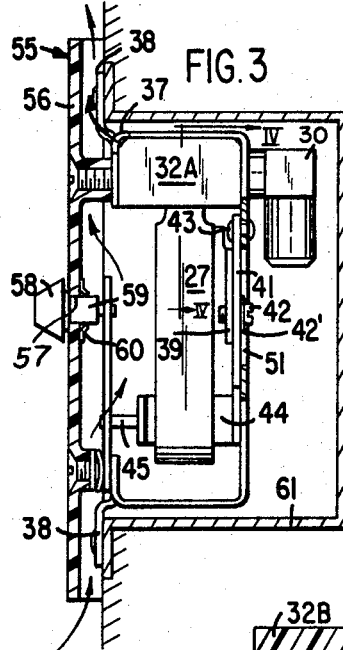
FIGURE 3 is a side elevational view of the preferred embodiment of the control mechanism with a cover plate assembly atttached thereto.
Figure 5:
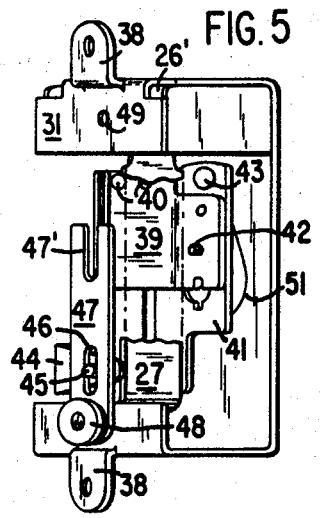
FIGURE 5 is a perspective view of the control mechanism with a portion of the bimetallic element broken away to illustrate certain of the operating parts of the mechanism.
Figure 4:
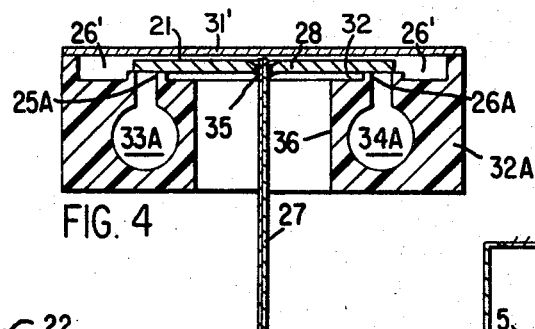
FIGURE 4 is a partial sectional view taken along lines IV—IV of FIGURE 3 showing the blocking means, the bleed block, and a portion of the bimetallic element.

Frame member 31 has notches 37 therein to pass control air bled from ports 25A, 26A and space 26'. Tangs 38 are provided on frame 31 for mounting the thermostat in a suitable casing 61 (FIGURE 3).

The aforementioned bimetallic element 27 has a U-shaped configuration and is mounted on forwardly projecting flanges 39' of preadjustment plate 39 by suitable means such as rivets 40. The preadjustment plate 39 is mounted on a pivot plate 41 by means of a screw 42. A lockwasher 42' is provided to prevent screw 42 from loosening. The frame member 31 has a relief 51 formed in the back surface thereof to prevent interference between screw 42 and frame member 31 when plate 41 is pivoted. The location of preadjustment plate 39 on pivot plate 41 is preset at the factory to position slider plate 28 on bleed block 32A to calibrate the thermostat, before screw 42 is tightened to lock plates 39 and 41 together.

Pivot plate 41 is pivotally mounted on frame 31 by rivet 43. A forwardly and laterally projecting arm portion 44 of pivot plate 41 is provided with a forwardly projecting pin 45 for sliding engagement in slot 46 of temperature control arm 47 which is pivoted on frame 31 by means of a pivot pin 48. By moving temperature control arm 47, plate 41 is pivoted about rivet 43 which in turn causes bimetallic element 27 to move slider plate 28. The room occupant thus may easily adjust the thermostat to maintain the room temperature.

Threaded hole 49 in frame 31 and threaded hole 50 in rivet 48 are provided for mounting a cover plate assembly 55 over thermostat 22 when the thermostat is mounted in a wall or similar location. It should be noted that thermostat 22 could be mounted in a wall remote from the unit, within casing 2 or any other suitable location, the only requirement being that room air must be allowed to circulate around the bimetallic element. When the thermostat 22 is mounted in casing 2, provision may be made for passing a portion of the induced room air, flowing through the unit, over the thermostat.

When the thermostat is mounted in a remote location such as in a wall, the cover plate can be mounted to provide a space between the cover and the thermostat so that room air can circulate around the thermostat bimetallic element. In this type of installation, bleed air passing through passages 26' of the preferred embodiment of our invention, out notches 37, and through the cover-thermostat space into the room will serve to induce a flow of room air around the bimetallic element as shown by the arrows in FIGURE 3. The cover plate assembly 55 illustrated in FIGURE 3 consists of a cover plate 56 having a horizontal slot 57 therein. A knob 58 with an extending rod portion 59 formed thereon is slidably held in slot 57 by a spring clip 60. The rod portion 59 of knob 58 projects through slot 57 by a spring clip 60. The rod portion 59 of knob 58 projects through slot 47' of control arm 47 so that by sliding knob 58 horizontally, control arm 47 is pivoted about pin 48, thereby changing the thermostat setting to vary the room air temperature.

Figure 6:
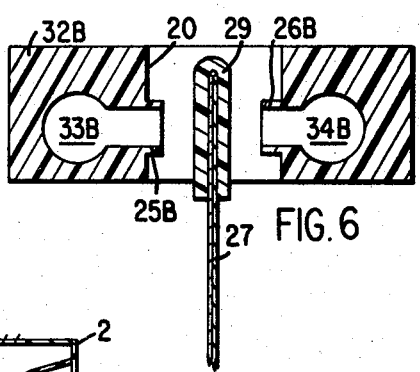
FIGURE 6 is a partial sectional view of the bleed block, blocking means and a portion of the bimetallic element of a second embodiment of the control mechanism.

A second embodiment of our invention, as illustrated in FIGURE 6, employs all the aforementioned components of the preferred embodiment of our invention, except bleed block 32A and slider plate 28. In the second embodiment, a bleed block 32B is provided having an inlet 33B communicating with heating line 23 and an inlet 34B communicating with cooling line 24 through fittings 30. Heating port 25B and cooling portion 26B communicate with inlets 33B and 34B respectively. A bleed plate 29 of a poor heat conducting material is provided for attachment to the free end of bimetallic element 27 so that the movement of the free end of bimetallic element 27 will cause the bleed plate 29 to block port 25B, port 26B or neither. As can be seen from FIGURE 6, a central passageway 20 is provided in bleed block 32B so that bimetallic element 27 with bleed plate 29 thereon may freely project therein.

Considering the operation of the control system under summer conditions, control air is supplied from plenum chamber 3, through filter 12. Air from filter 12 then passes through restriction member 13. Pressure downstream of the restriction member is transmitted to the bellows 10 to operate damper 7 via line 17. Changeover valve 19 receives air via line 18. The valve senses the temperature of the conditioning medium flowing through heat exchanger 6. If the temperature of the cooling medium flowing through the heat exchanger is below a certain temperature, for example 65° F., changeover valve 19 will communicate lines 18 and 24.

Counterbalance 9 urges damper 7 clockwise as viewed in FIGURE 1 to permit more induced air to pass through heat exchanger 6. The amount of air bled from line 24 is determined by the bimetallic element which senses the temperature of the room air surrounding it. As the temperature of the room air is lowered to a predetermined temperature and cooling requirements decrease, the bimetallic element will warp, and restrict flow of air from line 24. This will cause a pressure rise in the control lines which will cause bellows 10 to expand and move damper 7 as to restrict the flow of induced air through heat exchanger 6. When the room temperature rises above the desired temperature, the bimetallic element will warp, bleeding air from line 24, reducing pressure in bellows 10 and opening damper 7 permitting more induced air to flow through heat exchanger 6 and be cooled thereby.

The thermostat 22 functions similarly during the heating cycle. Control air is provided through line 23 by changeover valve 19 when hot conditioning medium is provided for flow through heat exchanger 6. If the room is overheated, the thermostat bimetallic element will warp, stopping the flow of air through line 23, building up control pressure and closing damper 7 to prevent flow of induced air over heat exchanger 6. If the room is too cool, the bimetallic element will warp so as to bleed air from line 23, reducing air pressure in bellows 10 opening damper 7 so that induced air will flow over heat exchanger 6 and be heated thereby. Thus the dual-bleed thermostat of the present invention will maintain proper room temperature when the room unit is heating or cooling the room.

As was pointed out earlier, the calibration of the thermostat may be accomplished at the factory by locking the preadjustment plate at the desired location on the pivot plate by means of screw 42. The location of the temperature control arm may be adjusted by the occupants of the room to vary room temperature to suit their individual preference.

While we have described a preferred embodiment of our invention, it is to be understood that our invention is not limited thereto but may be otherwise embodied within the scope of the following claims.

We claim:
1. A bleed type control mechanism comprising:
a frame;
a bleed block mounted in said frame;
said bleed block having first and second bleed ports, said ports being adapted for connection to a source of control air;
a plate operably associated with said bleed block for selectively regulating flow of air through said ports;
adjustable support means pivotally mounted on said frame;
a bimetallic element, one end of said bimetallic element being affixed to said adjustable support means, said plate being operably associated with the other end of said bimetallic element for movement therewith in response to area temperature variations to regulate flow of air through said ports.

2. A bleed type control mechanism according to claim 1 wherein said plate has a slot therein;
said bimetallic element projecting through the slot in said plate so that warping of said bimetallic element in response to area temperature variations moves said plate.

3. A bleed type control mechanism according to claim 1 wherein said adjustable support means comprises:
a pivot plate pivotally affixed to said frame;
a preadjustment plate adjustably mounted on said pivot plate, said bimetallic element being affixed to said preadjustment plate;
locking means operatively associated with said pivot plate and said preadjustment plate to prevent relative movement therebetween after the preadjustment plate has been properly positioned on said pivot plate; and
means operatively connected to said pivot plate to pivot said pivot plate and thereby adjust the position of said bimetallic element and said plate.

4. A bleed type control mechanism according to claim 1 further including a casing, a removable cover for said casing, said casing and cover forming an enclosure for said mechanism, said cover being mounted relative to said casing so that air outside the enclosure may be induced therethrough under the influence of control air flowing from said bleed port to circulate air about said plate actuating means.

5. A bleed type control mechanism according to claim 1 wherein said plate is adapted to lift off said ports to bleed air therefrom under the influence of excessive pressure supplied thereto.

6. A bleed type control mechanism according to claim 1 wherein said bleed block has a recess formed in the top surface thereof, said plate being adapted for movement in said recess for covering said ports, said frame member having a top portion thereof for enclosing said slider plate in the recess of said block while providing clearance between said slider and the top portion of said frame to allow lifting of said plate from the bleed ports under the influence of excessive air pressure supplied thereto.

7. A bleed type control mechanism comprising:
a frame having a substantially flat portion;
a bleed block mounted in said frame, the top of said bleed block being in mating engagement with the flat portion of said frame, said bleed block having a recess formed in a surface thereof with first and second bleed ports in said block communicating therewith, said ports being adapted for selective connection to a source of control air;
a plate disposed in the recess of said bleed block for movement therein to selectively cover said bleed ports to regulate the air flow therethrough, said plate and said recess being dimensioned so as to provide a clearance space between said plate and the flat portion of said frame for movement of said plate off said ports under the influence of excessive control air pressure; and
means operable in response to temperature variations in the area surrounding the control mechanism to actuate said plate.

8. A bleed type control mechanism according to claim 7 wherein said plate has a slot therein, said means for actuating said plate comprising a bimetallic element, adjustable support means pivotally mounted on said frame, one end of said bimetallic element being affixed to said adjustable support means, the other end of said bimetallic element projecting through the slot in said plate so that warping of said bimetallic element in response to area temperature variations moves said plate.

9. A bleed type control mechanism according to claim 7 wherein said adjustable support means comprises:
a pivot plate pivotally affixed to said frame;
a preadjustment plate adjustably mounted on said pivot plate, said bimetallic element being affixed to said preadjustment plate;
locking means operatively associated with said pivot plate and said preadjustment plate to prevent relative movement therebetween after the preadjustment plate has been properly positioned on said pivot plate; and
means operatively connected to said pivot plate to pivot said pivot plate and thereby adjust the position of said bimetallic element and said plate.

10. A bleed type control mechanism according to claim 7 further including a casing, a removable cover for said casing, said casing and cover forming an enclosure for said mechanism, said cover being mounted relative to said casing so that air outside the enclosure may be induced therethrough under the influence of control air flowing from said bleed port to circulate air about said plate actuating means.

11. A bleed type control mechanism according to claim 7, said means for actuating said plate comprising a bimetallic element, adjustable support means pivotally mounted on said frame, one end of said bimetallic element being fixed to said adjustable support means, said plate being affixed to the other end of said bimetallic element for movement therewith in response to area temperature variations.

12. A bleed type control mechanism according to claim 7 wherein said adjustable support means comprises:

a pivot plate pivotally affixed to said frame;

a preadjusted plate adjustably mounted on said pivot plate, said bimetallic element being affixed to said preadjustment plate;

locking means operatively associated with said pivot plate and said preadjustment plate to prevent relative movement therebetween after the preadjustment plate has been properly positioned on said pivot plate; and means operatively connected to said pivot plate to pivot said pivot plate and thereby adjust the position of said bimetallic element and said plate.

References Cited

UNITED STATES PATENTS

| | | | |
|---|---|---|---|
| 657,677 | 9/1900 | Roesch | 236—87 X |
| 1,953,406 | 4/1934 | Hodgson | 236—79 |
| 2,232,219 | 2/1941 | Dueringer | 236—82 |

WILLIAM J. WYE, *Primary Examiner.*

UNITED STATES PATENT OFFICE
CERTIFICATE OF CORRECTION

Patent No. 3,411,711                                                        November 19, 1968

Arthur C. O'Hara et al.

It is certified that error appears in the above identified patent and that said Letters Patent are hereby corrected as shown below:

Column 1, line 65, "substantailly" should read -- substantially --. Column 2, line 56, "atttached" should read -- attached --. Column 3, line 53, "lement" should read -- element --. Column 4, lines 47 to 49, cancel "The rod portion 59 of knob 58 projects through slot 57 by a spring clip 60. --; line 61, "portion 26B" should read -- port 26B --. Column 5, line 18, after "7" insert -- so --. Column 8, line 1, "preadjusted" should read -- preadjustment --.

Signed and sealed this 7th day of April 1970.

(SEAL)
Attest:

Edward M. Fletcher, Jr.                                  WILLIAM E. SCHUYLER, JR.
Attesting Officer                                              Commissioner of Patents